United States Patent Office 3,850,887
Patented Nov. 26, 1974

3,850,887
LACTAM COPOLYAMIDES FOR ADHESIVE USE
Francis R. Halas, Chelsea, and Conrad Rossitto, Andover, Mass., assignors to USM Corporation, Flemington, N.J.
No Drawing. Filed Sept. 13, 1972, Ser. No. 288,562
Int. Cl. C08g 20/20
U.S. Cl. 260—78 L
2 Claims

ABSTRACT OF THE DISCLOSURE

Copolyamides particularly useful as wash-resistant and dry-cleaning resistant, heat-activatable adhesives for bonding fabrics are obtained by reacting and polymerizing in a special range of proportions a lactam having a carbon chain of from 6 to 13 carbon atoms, a dicarboxylic aliphatic acid having a carbon chain of from 6 to 10 carbon atoms, a dicarboxylic aliphatic acid having a carbon chain of from 11 to 13 carbon atoms, a linear diamine having a carbon chain of from 2 to 13 carbon atoms and, preferably, a hindered diamine.

Field of Use and Background Relative to the Invention

Adhesive compositions are becoming increasingly used, for example in the garment manufacturing trade, for bonding fabrics together. In the garment manufacturing trade it is known to bond two fabrics together using a hot melt adhesive composition which is capable of being activated by heat and pressure in a pressing operation. However, in many cases the physical properties of the adhesive composition have to be quite specific in order to retain a satisfactory adhesive bond throughout the lifetime of a garment. For example, an adhesive composition for use in the garment manufacturing trade may be required to retain its bond strength when a garment is being washed in warm soapy water and also when the garment is being dry cleaned in cleaning solvents such as perchloroethylene, trichloroethylene or alcoholic spirits. In addition to the requirement of resistance to dry-cleaning solvents and to washing in warm soapy water, it is important that adhesives have a relatively wide softening point range to enable their use effectively in industrial adhesive bonding of fabric sheet, for example, in the known procedures for depositing spaced dots of adhesive from powdered resin adhesive.

It is known in the garment manufacturing trade that adhesive compositions comprising polyester generally show good retention of bond strength when employed between two fabrics when the fabrics are immersed in warm soapy water. However, these adhesive compositions comprising polyester tend to dissolve when immersed in dry cleaning solvents and the fabrics may therefore come apart on dry cleaning. Adhesive compositions comprising polyamide are also known in the garment manufacturing trade for bonding two fabrics together. These compositions are generally not unduly affected when employed between two fabrics immersed in dry-cleaning solvents but a difficulty is often found when using these adhesive compositions comprising polyamide in that polyamide tends to degrade in warm soapy water allowing the fabrics to come apart on washing.

Summary of the Invention

It has been found that acceptable bond strength in fabric to fabric bonds and good resistance to washing in warm soapy water and to dry cleaning may be obtained by use of an adhesive composition comprising a polyamide formed from a mixture in controlled proportions of at least one lactam, a mixture of aliphatic dicarboxylic acids and at least one diamine. The components are selected to give polymer molecules having a degree of irregularity which interferes with crystallization and contribute to a substantial degree amorphous characteristics giving a wide melting point range. In addition, the compounds selected for copolymerization include components having a relatively large number of carbon atoms in chains in repeating units of the copolyamide molecular chain to impart improved wash resistance to the composition together with components giving improved resistance to attack by dry-cleaning solvents. Also, by balancing the range of relative proportions and the conditions of polymerization to control the molecular weight and softening point range of the resulting copolyamide material, there is obtained a copolyamide material having physical properties enabling it when reduced to powdered condition to retain this condition without undue lumping while at the same time having a relatively wide range of softening or melting temperatures particularly avoiding critical temperature control and other handling problems encountered in use of the material for the hot melt adhesive between, for example, layers of fabric.

Description of the Preferred Embodiment

The copolyamide adhesive resin of the present invention is one which has substantial amorphous nature due to the irregular order in the copolymer chain of the residues of diverse components including lactam, dicarboxylic acids and diamine. These residues are arranged in random location and orientation and are combined in proportions effective to give resistance to washing and drying. The copolyamide resin when reduced to powdered condition retains this condition without objectionable lumping under storage and handling conditions while at the same time, the resin has a relatively wide range of softening or melting temperatures which reduce criticality of temperature control in use of the material as a heat-activatable adhesive between, for example, layers of fabric. Additionally, the copolyamide possesses good resistance to degradation and loss of strength when subjected to standard washing tests.

The mixture for reaction and copolymerization includes from about 40 to about 80 mol percent, preferably from 50 to 70 mol percent of at least one lactam based on the total mols of copolyamide forming reagents. In the determination of this mol percentage, the combination of one mol of dicarboxylic acid and one mol of diamine is considered as one mol of a polyamide forming reagent. Lactams useful in the present copolyamide are those which have, on opening of the ring, a carbon chain of from 6 to 13 carbon atoms. Caprolactam is most often used because of its cheapness and ready availability but other higher lactams, for example, lauryl lactam, may be used to increase resistance to washing.

The acid component of the copolyamide forming reagents is a mixture of at least two aliphatic dicarboxylic acids of which from about 10 to about 50 mol percent, preferably from about 15 to about 35 mol percent based on the total mols of copolyamide forming reagents is made up of at least one dicarboxylic acid having from 11 to 13 carbon atoms in the chain, for example, dodecanedioic acid. The remainder of the acid component will be from about 10 to about 40 mol percent, preferably from about 10 to about 25 mol percent of an aliphatic dicarboxylic acid having from 6 to 10 carbon atoms in the chain, for example, sebacic acid, azelaic acid or adipic acid. This mol percentage is based on the mols of copolyamide forming reagents of the reaction mixture.

The use of a mixture of dicarboxylic acids which enter the polyamide molecular chain in random location through reaction either with amine groups of an opened lactam or of a diamine component insures that the amide groups of one copolyamide resin chain are at different spacings than in a neighboring copolyamide chain to reduce the possibility of hydrogen bonding between amide groups of these adjoining chains by reducing the possibility of a succession of amide groups being disposed adjacent each other to create hydrogen bonding effects which would induce crystallization of the copolyamide material. Additionally, relative proportions of the two dicarboxylic acids provides control over the balance of wash resistance against dry-cleaning resistance. That is, the longer chain acids give superior resistance to washing but are more subject to attack by dry-cleaning solvents while the shorter carbon chain acids have greater resistance to washing.

Diamines are used in amount stoichiometrically equivalent to the dicarboxylic acids and may be one or a mixture of aliphatic diamines having the formula

where $x$ is from 2 to 13. Hexamethylene diamine is a preferred material because of its low cost and availability and the desirable character of polyamides obtained with diamines of this length.

Along with the aliphatic diamine, there may be used a hindered diamine in amount up to 30 mol percent of the total quantity of diamine. The hindered diamines are those that include side chains or ring groups effective sterically to interfere with close association of chains of the copolyamide. Preferred hindered amines include trimethylhexamethylene diamine, menthane diamine, dipiperidyl propane and isophorone diamine.

Reaction to form the copolyamide is effected by melting the lactam and acid components in a reaction vessel and then adding the diamine. The reaction mixture is then heated under reflux conditions until salt formation is complete and the temperature is then raised to eliminate water. When elimination of water is complete, preferably with application of a vacuum to eliminate final portions of water, heating is continued to bring the copolyamide material to the desired molecular weight, melt viscosity and melting point. The preferred molecular weight range is from about 8,000 to about 20,000 with a viscosity range of from about 450,000 to about 750,00 cps. at 180° C. as determined with a Brookfield viscometer fitted with a low shear rotor. The copolyamides may have melting points (ring and ball) in the range of from about 100° C. to about 150° C. If the softening point is too high, for example greater than about 175° C., difficulties may be encountered in activation of the adhesive composition, for example in steam press used to bond fabrics together. On the other hand, if the melting point is lower than about 100° C., the adhesive composition may tend to run excessively into the fabrics and even to strike through on activation of the adhesive in a heated press.

When polymerization is complete, the material is poured into a casting tray and when it has cooled and solidified, the resin is broken into coarse granules and then cryogenically ground suitably with use of liquid nitrogen.

The copolyamide resin adhesive may be used in various states for bonding fabrics, for example as a film, web, net, powder or even from molten state.

A known procedure for bonding fabrics includes the steps of depositing on one of the fabric surfaces to be bonded through use of a heat-resistant, rubbery e.g. silicone rubber, mat formed on one surface with spaced dimples which may be about 1 mm. in diameter and spaced about 2.5 mm. apart. Powdered resin adhesive is disposed on the dimpled surface of the mat and the mat wiped or scraped leaving powder in the dimples. Thereafter, fabric is laid down on the surface of the mat and heat is applied through the fabric to sinter the powder in the dimples and cause it to adhere to the surface of the fabric. The fabric is then removed from the mat carrying the sintered powder with it. For effective use in this process, it has been found important that the resin adhesive of the powder have a relatively wide softening point so that a temperature effective to stick the particles together and cause the stuck together particle to adhere to the fabric will not convert the mass of powder into a melted resin droplet which would be absorbed into the fabric. This is important both for effective transfer of the adhesive to the fabric and to the formation on the fabric of dots of fused adhesive powder capable of assembly with a further piece of fabric and being subjected to heat and pressure forming a strong adhesive union without greatly increasing the stiffness of the assembly.

Woven, knit or spun textiles having flexibility and cohesion for fabrication into a garment including textiles formed of natural fibers such as wool and woolen yarns (for example worsted), flax, cotton and silk, and man made fibers, for example rayon and polyester, may be bonded using the polyamide adhesive composition of the present invention. Suitably, the adhesive composition is used in quantities by weight of from 14 to 40 grams per square yard of fabric and more preferably, from 18 to 22 grams per square yard of fabric.

The following example is given as an aid in understanding the invention but it is to be understood that the invention does not relate to the particular time, temperatures, procedures, etc. of the invention.

EXAMPLE 1

A series of copolyamides were prepared by the procedure set forth below using reagent mixtures and forming products having the properties listed in the following table.

The procedure used for making the copolyamide involved melting the lactam and the dicarboxylic acid components together in a reaction vessel. Thereafter, diamine was added and the temperature allowed to rise to from 100° C. to 120° C. The reaction mixture was heated under reflux conditions until salt formation was completed and at this point the temperature was raised to 200° C. to eliminate water. The temperature of 200° C. was maintained for 2 hours and then a vacuum was applied to the reaction mixture and heating continued for a further hour at 200° C. At this point, polymerization was complete and the resinous polymeric materials was poured out into a casting tray.

The resinous material was cryogenically ground and screened to form a uniform powder having a particle size of from 60 to 210 microns.

The copolyamide powders were used to bond pieces of fabric and the bonds between the pieces of fabric were tested by the following procedure.

The power was disposed on the surface of a silicone rubber mat formed on that surface with dimples about 1 mm. in diameter and spaced about 2.5 mm. apart and the mat was scraped leaving powder in the dimples. A 7" x 9" piece of fabric lining material was a fiber content with 65% polyester and 35% cotton was disposed on the surface of the mat and heated and pressed with an iron set at a temperature of about 300° F. The heat caused the powder in the dimples to sinter together and to adhere to the fabric. The fabric with the adhered sintered powder was stripped from the dimpled mat and examined. A substantial proportion of the powder that had been in the dimples adhered to the fabric. The fabric with the dots thereon was heated under an infrared heater for 10 seconds to completely fuse the powder.

A 7" x 9" piece of suiting fabric with a fiber composition of 65% polyester and 35% cotton was assembled against the surface of the first piece of fabric and the assembly was pressed in an electric press at a temperature of 325° F.

After aging for one day, the sample was subjected to a laundering test involving subjecting the assembly to five 20 minute cycles of washing in a washing machine using wash water detergent containing 1% by weight at a temperature of 140° F. with drying of the assembly between wash cycles. The bond between the pieces of fabric was inspected after each drying cycle and the results noted in terms of resistance to separation of the pieces of fabric. Washing resistance listed as "fair" means that there had been some separation of the pieces of fabric, results listed as "good" mean that there had been some weakening of the bond and results listed as "excellent" mean that there had been no significant separation or weakening of the bond.

The bonding procedure was repeated with further samples which were subjected to 5 cycles of dry cleaning at a dry-cleaning establishment. As noted in the table, all of the copolyamides withstood the dry-cleaning tests with no weakening of bond.

about 450,000 to 750,000 cps. (Brookfield viscometer using low shear rotor), said copolyamide being a product of reacting and polymerizing a mixture of, based on the total copolyamide forming reagents, from about 50 to about 70 mol percent of at least one lactam having a carbon chain of from 6 to 13 carbon atoms, from about 15 to about 35 mol percent of at least one aliphatic dibasic acid having from 11 to 13 carbon atoms and from about 10 to about 25 mol percent of an aliphatic dibasic acid having from 6 to 10 carbon atoms and a stoichiometric amount of at least one diamine for reaction with said acid and aliphatic dibasic acid having from 6–10

| Mols per 100 mols of copolymer | Number— | | | | | | | |
|---|---|---|---|---|---|---|---|---|
| | 2 | 3 | 4 | 5 | 6 | 7 | 8 | |
| Caprolactam | 66.7 | 66.7 | 55 | 65 | 65 | 65 | 66.7 | 66.7 |
| Adipic | 10.6 | 10.6 | | | | | | 10.6 |
| Azelaic | | | | | | | 10.6 | |
| Sebacic | | | 18 | 14 | 14 | 14 | | |
| Dodecanedioic | 22.7 | 22.7 | 27 | 21 | 21 | 21 | 22.7 | 22.7 |
| Hexamethylene diamine | 30.0 | 33.3 | 33.3 | 33.3 | 29.75 | 32.3 | 33.3 | 33.3 |
| Trimethyl hexamethylene diamine | 3.3 | | | | 5.25 | 2.7 | | |
| Melting point, °C | 135–140 | 138–142 | 144–148 | 128–137 | 121–135 | 122–140 | 125–137 | 130–135 |
| Viscosity, cps. 180° C | 400,000 | 392,000 | 352,000 | 350,000 | 570,000 | 500,000 | 420,000 | 400,000 |
| Printing character | (1) | (2) | (2) | (3) | (1) | (1) | (1) | (2) |
| Laundering | (2) | (2) | (3) | (3) | (3) | (3) | (3) | (2) |
| Dry cleaning | (3) | (3) | (3) | (3) | (3) | (3) | (3) | (3) |
| Incipient melting, °C | 89 | 117 | 128 | 98 | 75 | 100 | 85 | 100 |
| Endotherm peak, °C | 128 | 136 | 142 | 118 | 111 | 142 | 113, 142 | 129 |
| Difference, °C | 39 | 19 | 14 | 20 | 36 | 42 | | 129 |

1 Good.  2 Fair.  3 Excellent.

It can be seen by comparison of copolyamides 1, 5 and 6 with the other copolyamides, that the inclusion of a hindered diamine, that is, trimethyl hexamethylene diamine, increases the temperature range over which softening occurs so that the resin powder is picked up more satisfactorily from the dimples in the silicone rubber mat, i.e., "prints" more satisfactorily, than do the copolyamides in which the hindered diamine is not used.

It will also be observed that resistance to laundering is better where sebacic acid having 10 carbon atoms is used as in copolyamides 3 to 6 then where adipic acid having only 6 carbon atoms is used as in copolyamides 1, 2 and 8 and also that azelaic acid having 9 carbon atoms is also more resistant to laundering than the copolyamides containing adipic acid.

Having thus described our invention what we claim as new and desire to secure as Letters Patent of the United States is:

1. A linear copolyamide useful as a hot melt adhesive for bonding fabrics, said copolyamide having a molecular weight of from about 8,000 to about 20,000, a softening point (ring and ball) in the range of from about 110° C. to about 175° C. and a melt viscosity at 180° C. of from carbon atoms, said diamine comprising at least about 70 mol percent of a linear aliphatic diamine having a carbon chain of from 2 to 13 carbon atoms and an amount effective sterically to interfere with close association of chains of the copolyamide up to 30 mol percent of a diamine of which the hydrogens of the amine groups are hindered by other groups in the compound.

2. A linear copolyamide as defined in claim 1 in which said hindered diamine is at least one member from the group consisting of trimethylhexamethylene diamine, isophorone diamine, menthane diamine and dipiperidyl propane.

References Cited
UNITED STATES PATENTS

| | | | |
|---|---|---|---|
| 2,252,555 | 8/1941 | Carothers | 260—78 L |
| 3,038,885 | 6/1962 | Best | 260—78 L |
| 3,515,702 | 6/1970 | Raabe | 260—78 L |

LUCILLE M. PHYNES, Primary Examiner

U.S. Cl. X.R.

117—139.5 A, 161 P; 156—164, 331; 161—227